United States Patent
Ogawa et al.

(10) Patent No.: US 7,525,728 B2
(45) Date of Patent: Apr. 28, 2009

(54) TRANSMISSIVE SCREEN AND REAR PROJECTION DISPLAY APPARATUS

(75) Inventors: Yasufumi Ogawa, Chiba (JP); Takaaki Iwaki, Tokyo (JP); Hiroaki Uchino, Tokyo (JP); Minoru Makida, Kanagawa (JP)

(73) Assignee: Sony Corporation (JP)

( * ) Notice: Subject to any disclaimer, the term of this patent is extended or adjusted under 35 U.S.C. 154(b) by 370 days.

(21) Appl. No.: 11/583,242

(22) Filed: Oct. 18, 2006

(65) Prior Publication Data

US 2007/0121208 A1 May 31, 2007

(30) Foreign Application Priority Data

Oct. 19, 2005 (JP) ............................ P2005-304677

(51) Int. Cl.
*G03B 21/60* (2006.01)
*G03B 21/56* (2006.01)

(52) U.S. Cl. ........................................ 359/457; 359/460

(58) Field of Classification Search ......... 359/455–457, 359/621, 624, 460, 742–743
See application file for complete search history.

(56) References Cited

U.S. PATENT DOCUMENTS

| | | | |
|---|---|---|---|
| 3,832,032 A * | 8/1974 | Shimada | ............... 359/456 |
| 4,374,609 A | 2/1983 | Lange | |
| 5,206,761 A | 4/1993 | Ogino et al. | |
| 5,513,037 A | 4/1996 | Yoshida et al. | |
| 5,880,887 A * | 3/1999 | Goto | ..................... 359/626 |
| 6,552,848 B2 * | 4/2003 | Kobayashi | ............... 359/457 |
| 2004/0240055 A1 | 12/2004 | Teramoto et al. | |

OTHER PUBLICATIONS

Ke-Wei Jaini et al., "P-96: Analyses and Suppression of Moire Patterns of LCD Rear Projection Screens" SID 01 Digest, vol. XXXII, 2001, pp. 938-941.

* cited by examiner

*Primary Examiner*—Christopher Mahoney
(74) *Attorney, Agent, or Firm*—Lerner, David, Littenberg, Krumholz & Mentlik, LLP

(57) ABSTRACT

A transmissive screen includes a first board member on a light source side, the first board member including a Fresnel lens on the surface of the light source side and one of a vertical lenticular lens or a horizontal lenticular lens on the surface of a viewer side; and a second board member on the viewer side, the second board member including the other of the vertical lenticular lens or the horizontal lenticular lens. The first board member includes a diffusing layer between the Fresnel lens and the lenticular lens on the surface of the viewer side at a position close to the Fresnel lens, wherein a relation represented by $\theta \geq \tan^{-1}(fp/2L)$ is obtained, where $\theta$ is a diffusion angle at which a distribution characteristic of diffused light passing through the diffusing layer is half the peak gain, $fp$ is a pitch of the Fresnel lens and $L$ is a light path between the diffusing layer and the lenticular lens on the surface of the viewer side.

12 Claims, 7 Drawing Sheets

TRANSMISSIVE SCREEN AND REAR PROJECTION DISPLAY APPARATUS

CROSS-REFERENCE TO RELATED APPLICATIONS

The present application claims priority from Japanese Patent Application No. JP 2005-304677 filed on Oct. 19, 2005, the disclosure of which is hereby incorporated by reference herein.

BACKGROUND OF THE INVENTION

1. Field of the Invention

The present invention relates to a transmissive screen for a rear projection display apparatus and the rear projection display apparatus.

2. Description of the Related Art

A rear projection display apparatus has been widely used as a kind of image display apparatus with a large screen. As is known, using a rear projection display apparatus, image light emitted from an image light source such as a CRT, LCD device, DLP (Digital Light Processing) device or the like is magnified and projected from the rear side to be viewed from the front side of a transmissive screen.

Lately, there has been a great demand for a thin rear projection display apparatus. Accordingly, there is considered a rear projection display apparatus in which an eccentric optical system is used where the center of screen (the center of a transmissive screen) may not correspond with a light axis.

A transmissive screen typically includes a Fresnel lens and a lenticular lens. A Fresnel lens includes minute prisms arranged in a concentric pattern, having the function of parallelizing image light radially incident from a mirror. There are two kinds of Fresnel lens, one of which uses refraction and the other of which uses partial reflection. In general, a Fresnel lens of partial reflection is used for a rear projection display apparatus including an eccentric optical system.

A lenticular lens has the function of expanding a viewing angle by deflecting incident light. Typically, there is used a horizontal lenticular lens with which the viewing angle in the horizontal direction is expanded (in which a plurality of cylindrical lenses are arrayed with the lengthwise direction thereof being directed in the vertical direction of a screen). However, in order to expand the viewing angle in the vertical direction as well, a vertical lenticular lens (in which a plurality of cylindrical lenses are arrayed with the lengthwise direction thereof being directed in the horizontal direction of a screen) may be used in addition to the horizontal lenticular lens.

Hereupon, with a transmissive screen being configured to have horizontal and vertical lenticular lenses as well as a Fresnel lens, a concentric pattern of the Fresnel lens and a lattice pattern formed by the horizontal and vertical lenticular lenses interfere with each other, which may cause moiré.

In the past, Japanese Published Patent Application No. 10-48404 (paragraphs 0021, 0147, 0160 and FIG. 1) discloses, for example, technology for reducing generation of moiré in a transmissive screen for a rear projection display apparatus, in which the transmissive screen includes a planar lens having a transparent micro-sphere arranged layer on a transparent substrate. However, replacing a lenticular lens with such planar lens is different from reducing generation of moiré in a transmissive screen provided with a Fresnel lens and a lenticular lens.

Further, a transmissive screen including horizontal and vertical lenticular lenses as well as a Fresnel lens typically has a structure in which the following three board members are superimposed:

(i) a board member including a substrate and a Fresnel lens;

(ii) a board member including a substrate and a horizontal lenticular lens; and (iii) a board member including a substrate and a vertical lenticular lens.

However, preparing a transmissive screen with three board members may increase production costs due to an increase in the number of components used and an increase in takt time. Further, with three board members being superimposed, the number of interfaces between those members may increase and cause light to be reflected thereon. Therefore, luminance may be lowered and stray light may increase, causing ghost which reduces the picture quality.

SUMMARY OF THE INVENTION

The present invention addresses the above-identified and other problems associated with conventional methods and apparatuses. It is desirable to reduce generation of moire, which enables costs and takt time to be reduced, luminance to be improved, and stray light to be reduced, in the case where a transmissive screen including a Fresnel lens and horizontal and vertical lenticular lenses is provided in a rear projection display apparatus using an eccentric optical system.

According to an embodiment of the present invention, there is provided a transmissive screen including a first board member on a light source side and a second board member on a viewer side. The first board member includes a Fresnel lens on a surface of the light source side and one of a vertical lenticular lens or a horizontal lenticular lens on a surface of the viewer side. The second board member includes the other of the vertical lenticular lense or the horizontal lenticular lens which is not included in the first board member. The first board member further includes a diffusing layer between the Fresnel lens on the surface of the light source side and the lenticular lens on the surface of the viewer side at a position close to the Fresnel lens, wherein a relation represented by $\theta \geq \tan^{-1}(fp/2L)$ is obtained, where $\theta$ is a diffusion angle at which the gain of diffused light passing through the diffusing layer is half the peak gain, fp is a pitch of the Fresnel lens, and L is a light path between the diffusing layer and the lenticular lens on the surface of the viewer side.

The transmissive screen includes two board members, one on the light source side and one on the viewer side. The Fresnel lens is provided on the surface of the light source side of the board member on the light source side. Since the direction of a tilt of image light incident on the upper end of the transmissive screen is similar to that of image light incident on the lower end thereof in the rear projection display apparatus using an eccentric optical system, the Fresnel lens with a reflecting surface is arranged on the light source side.

Further, one of the vertical or horizontal lenticular lenses is provided on the surface of the viewer side of the board member on the light source side. Furthermore, the other of the vertical or horizontal lenticular lenses is provided on the surface of the light source side of the board member on the viewer side.

The board member on the light source side includes the diffusing layer between the Fresnel lens and lenticular lens close to the Fresnel lens (that is, having a distance to the lenticular lens). After being diffused by the diffusing layer provided away from the lenticular lens, image light parallelized by the Fresnel lens is sequentially incident on the two lenticular lenses (the vertical lenticular lens and the horizontal lenticular lens) with a concentric pattern of the Fresnel lens being blurred.

Further, the relation represented by $\theta \geq \tan^{-1}(fp/2L)$ is obtained, where $\theta$ is a diffusion angle at which the gain of diffused light passing through the diffusing layer is half the peak gain, fp is a pitch of the Fresnel lens, and L is a light path between the diffusing layer and the lenticular lens on the surface of the viewer side of the board member on the light source side. Accordingly, image light passing through each prism of the Fresnel lens can be diffused by the diffusing layer in the range of one pitch or more with sufficient light intensity (light intensity of half the peak gain or more).

As a result, image light passing through a prism of the Fresnel lens is overlapped with image light passing through another prism thereof and sequentially incident on the two lenticular lenses (the vertical and horizontal lenticular lenses) with less contrast between the dark and light.

As described above, image light with the concentric pattern of the Fresnel lens being blurred and less contrast between the dark and light is incident on the vertical and horizontal lenticular lenses. Hence, interference between the concentric pattern of the Fresnel lens and the lattice pattern of the vertical and horizontal lenticular lenses is reduced, enabling generation of moiré due to the interference of those patterns to be reduced.

The transmissive screen having the Fresnel lens and the vertical and horizontal lenticular lenses includes two board members, one on the light source side and one on the viewer side. Therefore, compared to a transmissive screen of the related art including three board members, costs and takt time may be reduced with the reduction in the number of components, luminance being improved, and stray light being reduced with the number of interfaces reduced.

Next, according to another embodiment of the present invention, there is provided a rear projection display apparatus using an eccentric optical system having a light path not corresponding with the center of a screen, the rear projection display apparatus including a transmissive screen on which image light emitted from an image light source is projected from the rear side. The transmissive screen includes two board members, that is, a first board member on a light source side including a Fresnel lens on the surface of the light source side and one of a vertical lenticular lens or a horizontal lenticular lens on the surface of a viewer side; and a second board member on the viewer side including the other of the vertical lenticular lens or the horizontal lenticular lens which is not included in the first board member. The first board member further includes a diffusing layer between the Fresnel lens and the lenticular lens on the surface of the viewer side at a position close to the Fresnel lens, wherein a relation represented by $\theta \geq \tan^{-1}(fp/2L)$ is obtained, where $\theta$ is a diffusion angle at which the gain of diffused light passing through the diffusing layer is half the peak gain, fp is a pitch of the Fresnel lens, and L is a light path between the diffusing layer and the lenticular lens on the surface of the viewer side.

The rear projection display apparatus uses an eccentric optical system and includes a transmissive screen according to an embodiment of the present invention, in which moiré is prevented from being generated, causing costs and takt time to be reduced, causing luminance to be improved, and causing stray light to be reduced.

According to the embodiments, moiré is prevented from being generated, enabling costs and takt time to be reduced, enabling luminance to be improved, and preventing stray light from occurring, in the case where a transmissive screen including a Fresnel lens and horizontal and vertical lenticular lenses is provided in a rear projection display apparatus using an eccentric optical system.

DETAILED DESCRIPTION

Figure 1:
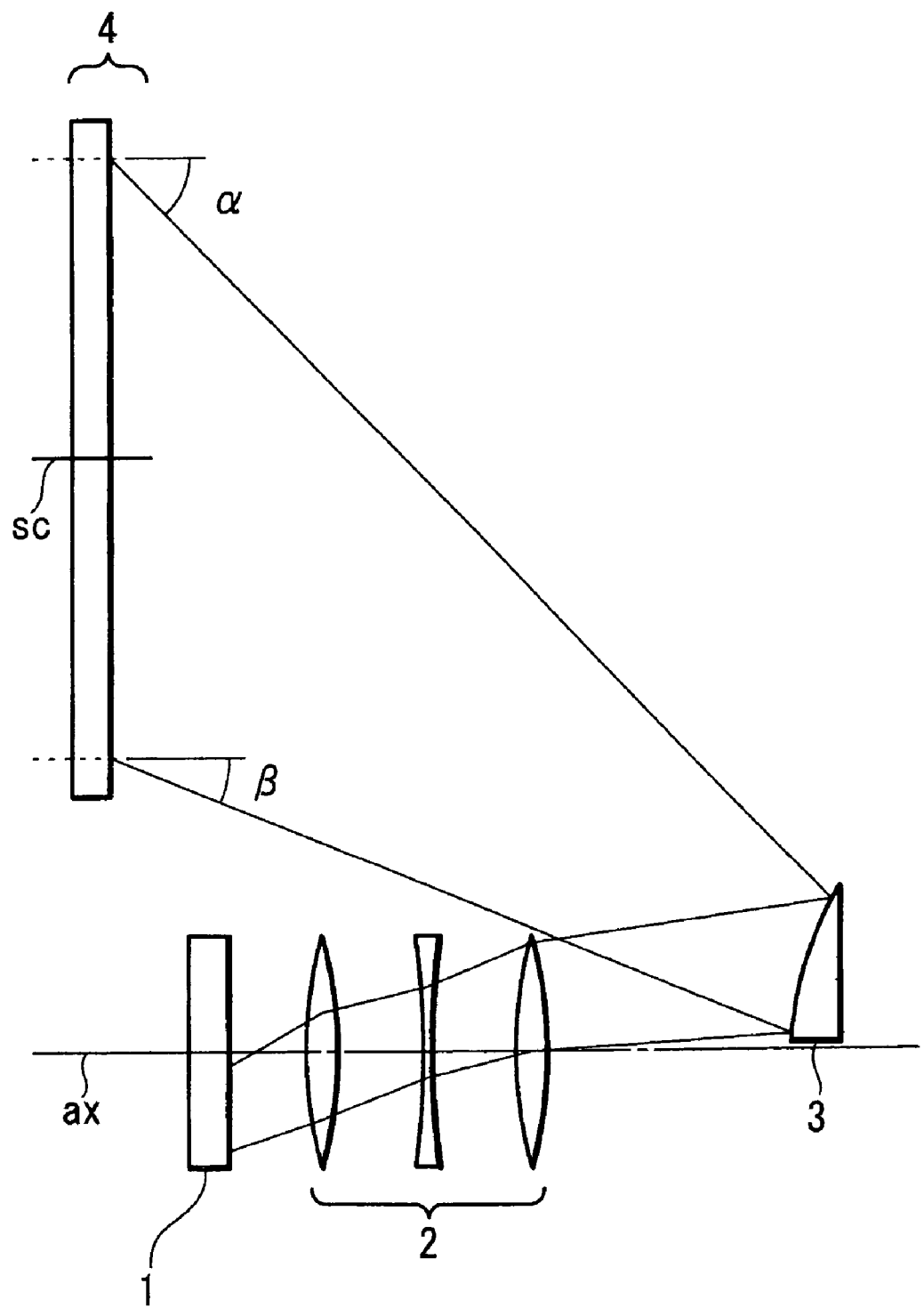
FIG. 1 is a schematic view showing an optical system of a rear projection display apparatus to which an embodiment of the present invention is applied.

Embodiments of the present invention will be explained in the followings with reference to drawings. FIG. 1 is a schematic view showing an optical system of a rear projection display apparatus to which an embodiment of the present invention is applied. A CRT, LCD device, or DLP (Digital Light Processing) device, for example, constitutes an image light source 1 driven in accordance with video data supplied from a video signal processing system not shown, emitting image light.

Image light emitted from the image light source 1 is incident on a projection mirror 3 after being magnified by a projection lens 2 including a plurality of lenses combined. Then, the light is reflected and magnified by the projection mirror 3, being projected on a transmissive screen 4 from the rear surface thereof to be emitted to a viewer side.

The above-described optical system employs an eccentric optical system in which the screen center (the center of a surface of the transmissive screen 4) SC does not correspond with an optical axis ax of the projection lens 2, that is to say, the screen center SC is not on the optical axis ax of the projection lens 2. Therefore, the direction of a tilt of image light incident on the upper end (incident angle α) of the transmissive screen 4 is similar to that of image light incident on the lower end (incident angle β) thereof.

Figure 2:
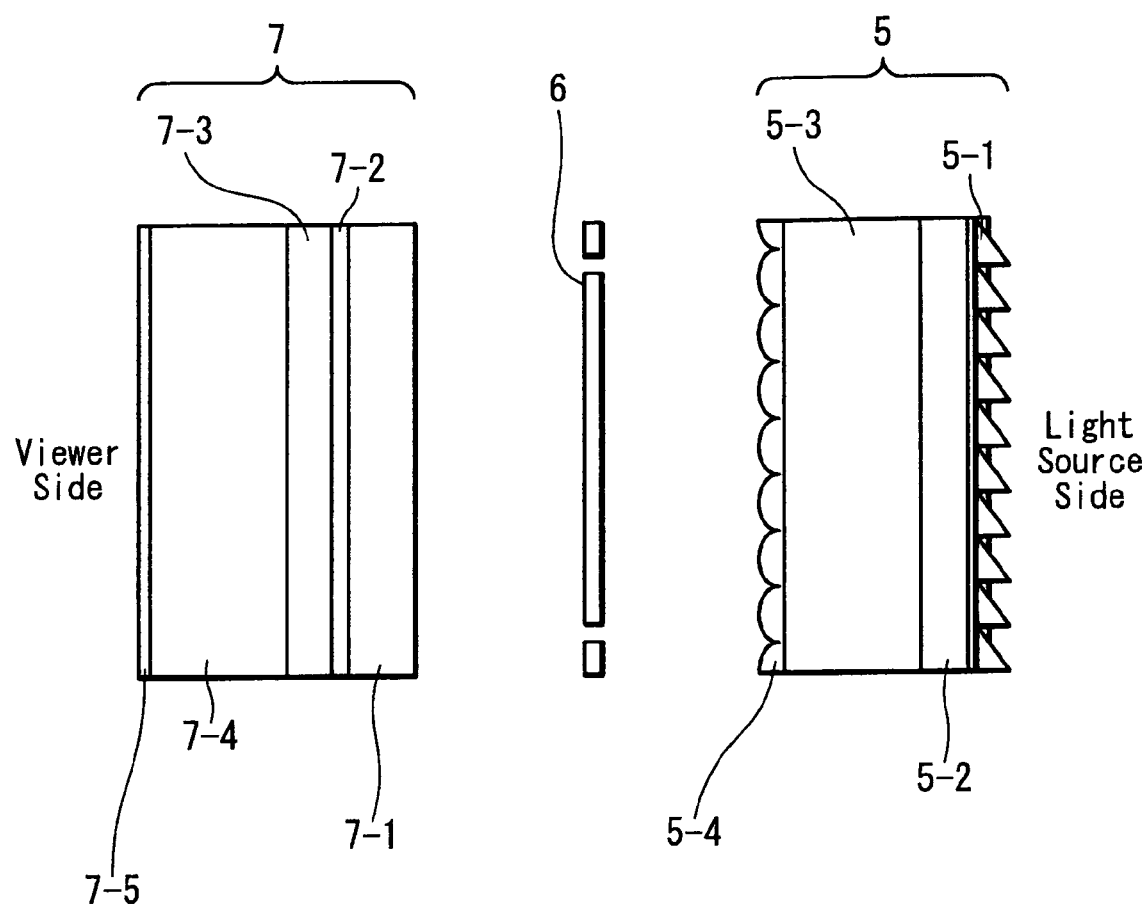
FIG. 2 is a view showing a cross-section of a transmissive screen in FIG. 1.

FIG. 2 shows a cross-section of the transmissive screen 4. The transmissive screen 4 includes two board members: a board member 5 on the light source side (on the right in the figure) and a board member 7 on the viewer side (on the left in the figure). Note that a spacer 6 will be explained later on using FIG. 10 and other figures.

The board member 5 on the light source side includes: a Fresnel lens 5-1, a diffusing layer 5-2, a substrate 5-3, and a vertical lenticular lens 5-4 in this order from the surface on the light source side thereof. The vertical lenticular lens 5-4 is provided on the surface of the viewer side. The board member 7 on the viewer side includes: a horizontal lenticular lens 7-1, black stripe (BS) 7-2, a diffusing layer 7-3, a substrate 7-4, and a surface processing layer 7-5 in this order from the surface on the light source side thereof. The surface processing layer 7-5 is provided on the surface of the viewer side.

The Fresnel lens 5-1 includes minute prisms arrayed in a concentric pattern, having the function of parallelizing image light radially incident thereon from the projection mirror 3 shown in FIG. 1. There are two kinds of Fresnel lens, one of which uses refraction and the other of which uses total reflection. Since the eccentric optical system is employed in this embodiment, an angle of light beams incident on the Fresnel lens is large. In addition, since the Fresnel lens is arranged on the light source side, the Fresnel lens of a refraction type may allow stray light, caused by light beams not incident on the lens surface, to be generated. In order to avoid stray light, a Fresnel lens of a reflection type is used as the Fresnel lens 5-1.

The diffusing layer 5-2 has the function of controlling generation of moiré and the function of scattering and reducing stray light by causing image light passing through the board member 5 to have a viewing angle characteristic.

First, reduction of stray light by the diffusing layer 5-2 is explained (regarding control on the generation of moiré will be explained later on using FIGS. 8 and 9).

When image light is incident on and emitted through the Fresnel lens 5-1, part of the image light may be reflected to be stray light.

Figure 3:
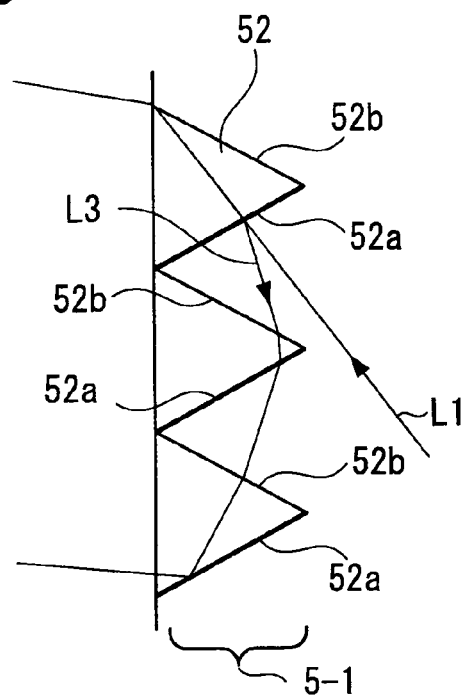
FIG. 3 is a view showing stray light being generated when image light is incident on a Fresnel lens shown in FIG. 2.

FIG. 3 shows generation of stray light when image light is incident on the Fresnel lens 5-1. Image light L3, which is part of the image light L1 incident on the Fresnel lens 5-1, is reflected by a refractive surface 52a of a prism 52 constituting the Fresnel lens 5-1. Then, the reflected light L3 is incident on the next prism 52, being refracted by a reflective surface 52b and the refractive surface 52a to be stray light. Subsequently, the light is further incident on the next prism 52 to be reflected by the refractive surface 52a thereof and is emitted from an emitting surface (not shown in the figure).

Figure 4:
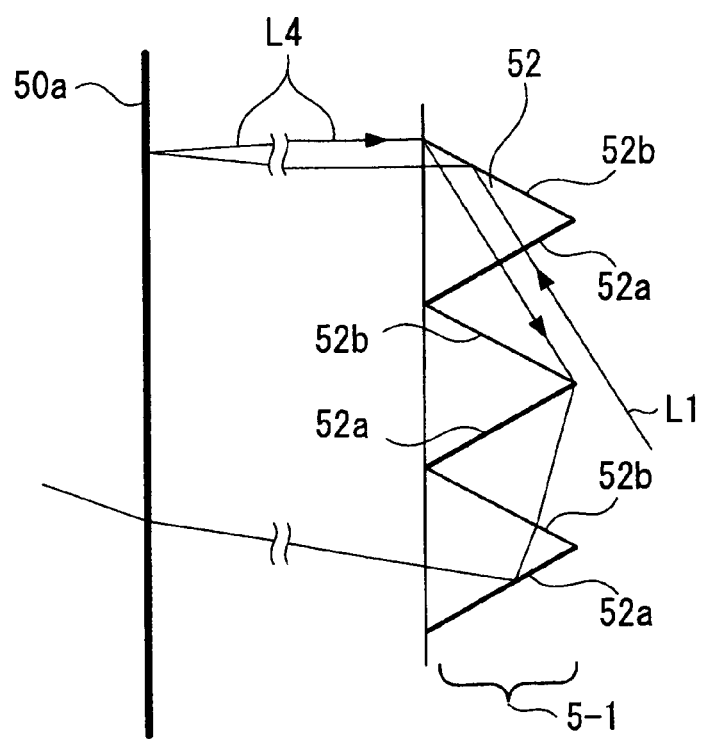
FIG. 4 is a view showing stray light being generated when image light is emitted through the Fresnel lens shown in FIG. 2.

FIG. 4 shows generation of stray light when image light is emitted through the Fresnel lens 5-1. Part of image light L1 incident on the Fresnel lens 5-1, which is refracted by the refractive surface 52a of the prism 52 and is reflected by the reflective surface 52b thereof, reaches the emitting surface 50a. However, light L4 which is part of the image light reached the light emitting surface 50a is reflected thereon, returning to the prism 52 where the light has passed through. Then, the returned light L4 is reflected and refracted by the reflective surface 52b and refractive surface 52a, respectively and is further incident on the next prism 52, being refracted by the reflective surface 52b and refractive surface 52a to be stray light. Subsequently, the light is further incident on the next prism 52 and is reflected by the refractive surface 52a to be emitted from the emitting surface 50a.

The diffusing layer 5-2 has the function of reducing stray light passing through the board member 5 by thus diffusing stray light generated in the Fresnel lens 5-1.

Figure 5:
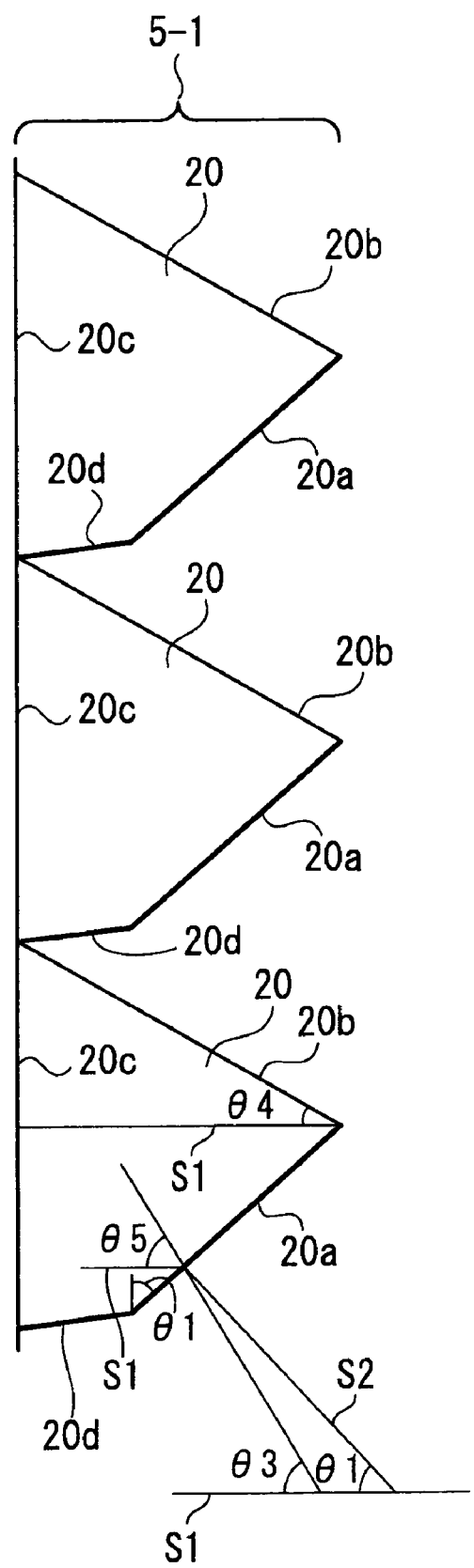
FIG. 5 is a view showing an example of a Fresnel lens in which the shape of each prism is polygonal.

Note that the shape of prisms constituting the Fresnel lens 5-1 is triangular in FIG. 2. However, the shape is preferably polygonal in order to reduce stray light generated in the Fresnel lens 5-1. FIG. 5 shows an example of a prism having a polygonal shape.

In this example, each prism 20 constituting the Fresnel lens 5-1 has a refractive surface 20a that refracts incident light, a reflective surface 20b that reflects light refracted by the refractive surface 20a to the viewer side, a third surface 20c (parallel to the board surface of the board member 5), and a fourth surface 20d positioned between the refractive surface 20a and the third surface 20c. In other words, the cross-section of each prism 20 is not triangle but is quadrilateral.

An angle θ1 formed by a line S2 perpendicular to the refractive surface 20a of each prism 20 and a line S1 perpendicular to the board surface of the board member 5 (equal to an angle of the refractive surface 20a with respect to the board surface of the board member 5) is smaller than a minimum angle (incident angle β shown in FIG. 1) incident from the projection mirror 3 onto the transmissive screen 4 shown in FIG. 1.

An angle θ4 of the reflective surface 20b of each prism 20 with respect to the board surface of the board member 5 is smaller than half the angle θ formed by light refracted by the refractive surface 20a and the perpendicular line S1 regarding all portions of the Fresnel lens 5-1.

Figure 6:
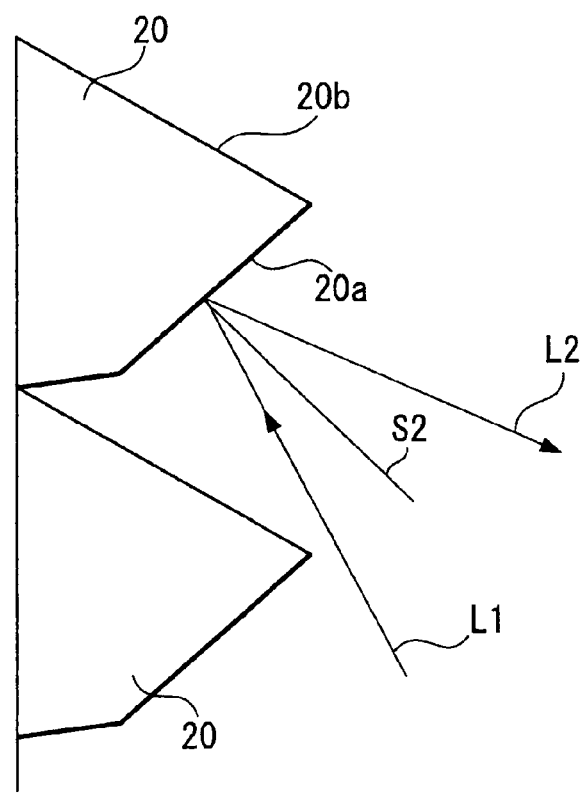
FIG. 6 is a view showing stray light prevented from being generated when image light is incident on the Fresnel lens using the prisms shown in FIG. 5.

FIG. 6 shows control on generation of stray light, when image light is incident on the Fresnel lens 5-1 using the above-described prisms 20. Light L2 that is part of the image light L1 incident on the Fresnel lens 5-1 from the projection mirror 3 shown in FIG. 1 is reflected by the refractive surface 20a of the prism 20.

However, an angle of light L2 reflected by the refractive surface 20a (the angle with respect to the perpendicular line S1) is smaller than the minimum incident angle β regarding all portions of the Fresnel lens 5-1, based on the above-described relation between the θ1 of the refractive surface 20a and the minimum incident angle β of image light from the projection mirror 3. In other words, the light L2 reflected by the refractive surface 20a goes in a direction away from the next prism 20, compared with the incident light L1.

Hence, the reflected light L2 is prevented from being incident on the next prism 20, differently from the case shown in FIG. 3. Therefore, the image light reflected when being incident on the Fresnel lens 5-1 is controlled so as not to be stray light.

Figure 7:
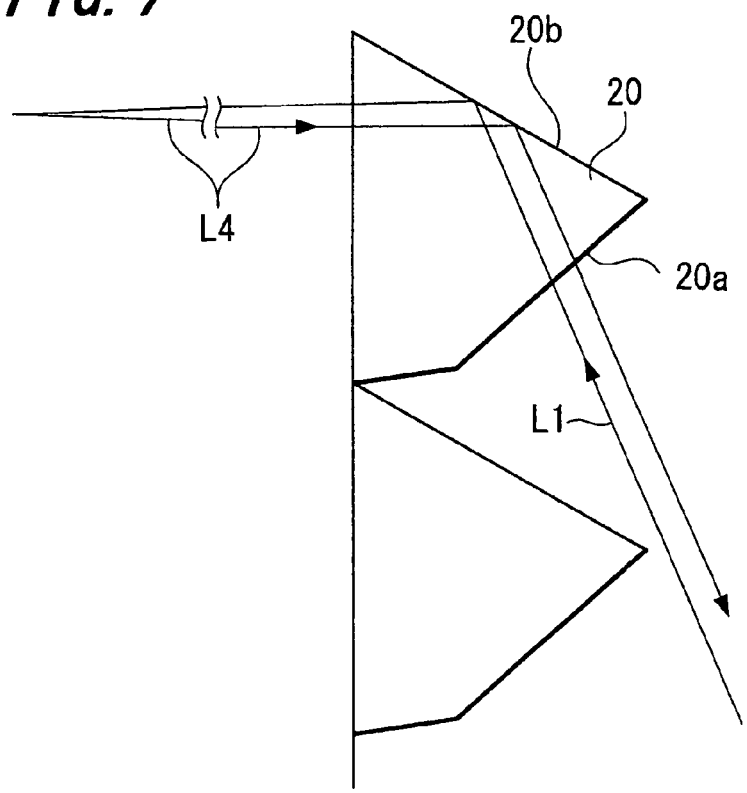
FIG. 7 is a view showing stray light prevented from being generated when image light is emitted through the Fresnel lens using the prisms shown in FIG. 5.

FIG. 7 shows control on the generation of stray light, when image light is emitted through the Fresnel lens 5-1 including the prisms 20 shown in FIG. 5. Image light refracted by the refractive surface 20a of the prism 20 and reflected by the reflective surface 20b thereof among the image light L1 incident on the Fresnel lens 5-1 goes to the surface on the viewer side of the board member 5. However, light L4 that is part of the image light goes to the surface on the viewer side is reflected in the middle and returns to the prism 20 where the light has passed through.

Here, the light L4 returns to the prism 20 at a position closer to the top of the prism 20, regarding all portions of the Fresnel lens 5-1, compared with the position where the light has been reflected by the reflective surface 20b, based on the above-described relation between the angle θ4 of the reflective surface 20b and the angle θ5 of the refracted light. Accordingly, after being refracted by the reflective surface 20b, the returned light L4 goes through a position away from the next prism 20, compared with the position where the light has been incident on the Fresnel lens 5-1.

Hence, the returned light L4 is prevented from being incident on the next prism 20, differently from the case shown in FIG. 4. Therefore, the light reflected when being emitted through the Fresnel lens 5-1 is controlled so as not to be stray light.

A glass substrate is used as the substrate 5-3 shown in FIG. 2. Reasons are explained in the followings. Since the Fresnel lens 5-1 is provided with the board member 5, a warp of the substrate 5-3 directly causes a deformation of an image. Accordingly, planarity and environment resistance may be required for the substrate 5-3. Typical resins are soft and tend to warp, and so it is difficult to obtain the planarity in the state of being incorporated in a set. Further, there is another problem that a warp may occur in the state of a plurality of layers made of different materials being laminated, when a temperature and humidity are changed. Therefore, a glass substrate is used as the substrate 5-3, enabling the planarity and environment resistance to be obtained.

The vertical lenticular lens 5-4 includes a plurality of cylindrical lenses with the lengthwise direction thereof directed in the lateral direction of the screen (the direction vertical to the drawing) and has the function of expanding the viewing angle in the vertical direction by deflecting incident light in the vertical direction.

The horizontal lenticular lens 7-1 includes a plurality of cylindrical lenses with the lengthwise direction thereof directed in the vertical direction of the screen (up and down direction in the drawing) and has the function of expanding the viewing angle in the horizontal direction by deflecting incident light in the horizontal direction.

The black stripe 7-2 includes a light-shielding member of a vertically-striped pattern on a focusing screen of the horizontal lenticular lens 7-1 in an area where no image light deflected by the horizontal lenticular lens 7-1 passes through, and has the function of shielding outer light and stray light in the board member 7.

The diffusing layer 7-3 functions as an auxiliary layer for the horizontal lenticular lens 7-1 expanding the viewing angle.

A glass substrate is used as the substrate 7-4. The horizontal lenticular lens 7-1 and the diffusing layer 7-3 are provided with the board member 7. Therefore, a warp of the substrate 7-4 directly causes a deformation and blur of an image. Accordingly, a glass substrate is used as the substrate 7-4 similar to the substrate 5-3, enabling the planarity and environment resistance to be obtained.

The surface processing layer 7-5 directly facing the viewer side may need to be wear-proof, scratch-proof, antifouling, antistatic, and antireflective. With intense reflected light caused by outer light, a black level in an image may be lowered, causing the contrast to be deteriorated. Therefore, it is important to reduce reflected light with respect to the anti-reflective property. Further the surface processing layer 7-5 may be required to have a property of preventing glass from being scattered in the case where the glass substrate 7-4 is damaged. Therefore, the surface processing layer 7-5 may include a film functioning as an AG (Anti-Glare) layer, clear AR (Anti-Reflection) coat, or AG-AR layer (AG layer coated with AR layer).

As described above, since the transmissive screen 4 includes the Fresnel lens 5-1 and the horizontal and vertical lenticular lenses (vertical lenticular lens 5-4 and horizontal lenticular lens 7-1), moiré may be caused by an interference between a concentric pattern of the Fresnel lens 5-1 and a lattice pattern formed by the vertical lenticular lens 5-4 and horizontal lenticular lens 7-1 without further measures being taken.

Generation of the moiré can be controlled by adjusting size and a pitch rate of the lattice pattern of the lenticular lens. However, restriction on the manufacture may prevent the size and pitch rate from being adjusted to be optimal. As described above, the diffusing layer 5-2 has the function of controlling the generation of the moiré. Next, the control on the moiré by means of the diffusing layer 5-2 is explained.

Since the diffusing layer 5-2 is provided between the Fresnel lens 5-1 and the vertical lenticular lens 5-4, image light parallelized by the Fresnel lens 5-1 is diffused by the diffusing layer 5-2 to be incident on the vertical lenticular lens 5-4 and horizontal lenticular lens 7-1 in this order in the state of the concentric pattern of the Fresnel lens being blurred.

In addition, the diffusing layer 5-2 is provided between the Fresnel lens 5-1 and the vertical lenticular lens 5-4 toward the light source side of the substrate 5-3, being arranged at a position close to the Fresnel lens 5-1 (away from the lenticular lens 5-4). Accordingly, image light parallelized by the Fresnel lens 5-1 is sequentially incident on the vertical lenticular lens 5-4 and the horizontal lenticular lens 7-1 in the state in which the concentric pattern of the Fresnel lens is further blurred.

Here, the diffusing layer 5-2 has a viewing angle characteristic represented by the following formula (1):

$$\theta \geq \tan^{-1}(fp/2L) \qquad \text{formula (1)}$$

where $\theta$ is a diffusion angle at which gain of diffused light passing through the diffusing layer 5-2 is half the peak gain (termed "½ angle in the viewing angle characteristic"); fp is a pitch of the Fresnel lens 5-1; and L is a light path between the diffusing layer 5-2 and the vertical lenticular lens 5-4.

Figure 8:
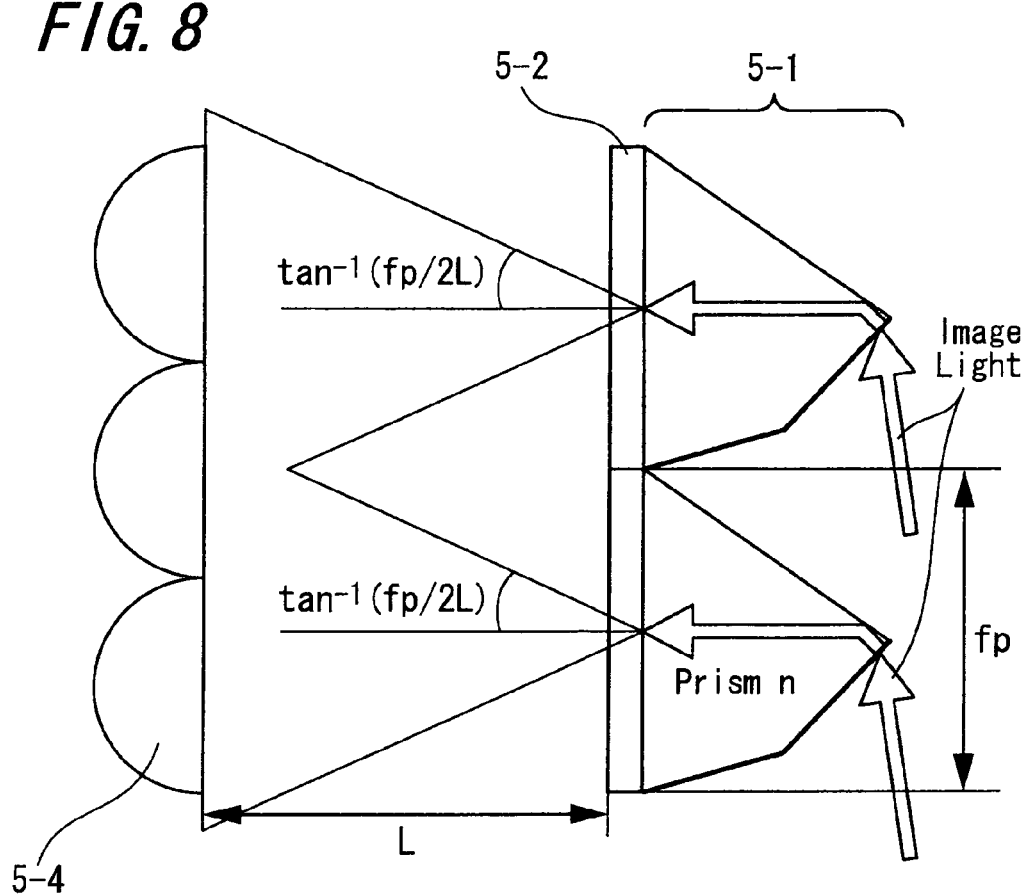
FIG. 8 is a view showing a relation among a pitch fp of the Fresnel lens, a light path L between the Fresnel lens and a vertical lenticular lens, and an angle of $\tan^{-1}(fp/2L)$.

FIG. 8 shows the relation between the pitch fp, light path L, and angle $\tan^{-1}(fp/2L)$ (here, the shape of prisms constituting the Fresnel lens 5-1 is polygonal as shown in FIG. 5). The angle $\tan^{-1}(fp/2L)$ is the angle of image light passed through each prism of the Fresnel lens 5-1, each having the range of the pitch fp of the Fresnel lens 5-1.

Accordingly, the above formula (1) indicates that image light passed through each prism of the Fresnel lens 5-1 is diffused by the diffusing layer 5-2 with a sufficient light intensity (half the peak gain or more), each having the range of one pitch or more of the Fresnel lens 5-1.

Figure 9:
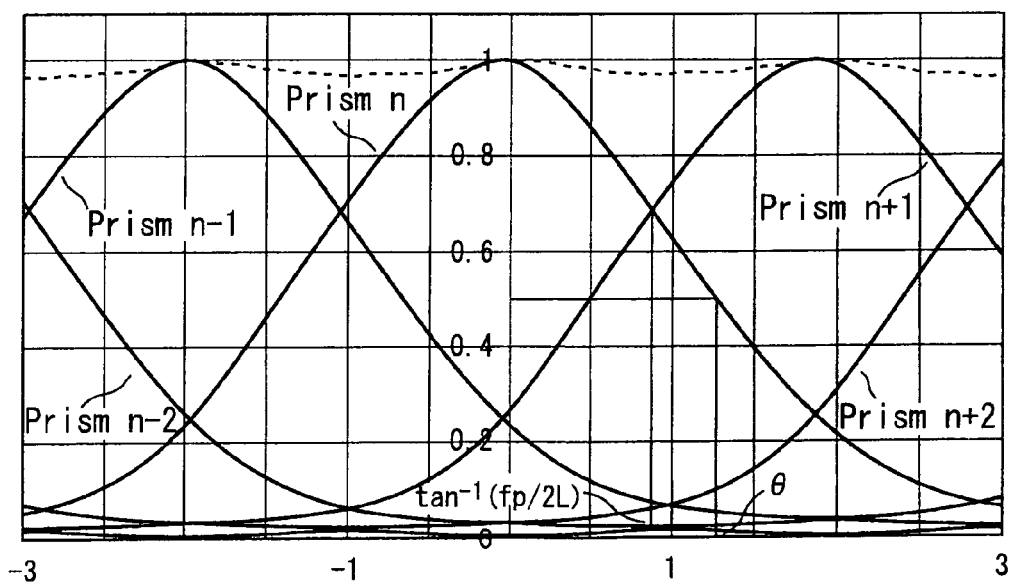
FIG. 9 is a characteristic curve showing an example of a viewing angle characteristic of a diffusing layer of a board member on the light source side.

FIG. 9 shows an example of the viewing angle characteristic of the diffusing layer 5-2 with the vertical axis indicating gain (light intensity) and the horizontal axis indicating an angle, in which 1 is a normalized maximum gain. Five solid waveform lines represent the viewing angle characteristic of adjacent five prisms n−2, n−1, n, n+1, and n+2 of the Fresnel lens 5-1, respectively. In this example, the ½ angle in the viewing angle characteristic (that is a diffusion angle at which the gain is 0.5) is larger than the angle of $\tan^{-1}(fp/2L)$ shown in FIG. 8, and the gain at the angle of $\tan^{-1}(fp/2L)$ is close to 70%.

Viewing angle characteristics of the prisms n−2, n−1, n, n+1, and n+2 of the Fresnel lens 5-1 are superimposed and normalized. A broken line represents the superimposed viewing angle characteristic. As shown in the figure, gain between peaks is high and luminance is not considerably different at any position. Specifically, since the diffusing layer 5-2 having the viewing angle characteristic represented by the above-described formula (1) is used, light beams emitted through adjacent prisms of the Fresnel lens 5-1 are superimposed to reduce the contrast between the dark and light.

Hence, image light passed through each prism of the Fresnel lens 5-1 is diffused by the diffusing layer 5-2 to be incident on the vertical lenticular lens 5-4 and horizontal lenticular lens 7-1, with the contrast between the dark and light being reduced.

Thus, image light with a blurred concentric pattern of the Fresnel lens 5-1, that is, with a reduced concentric contrast between the dark and light is incident on the vertical lenticular lens 5-4 and horizontal lenticular lens 7-1. Accordingly, interference between the concentric pattern of the Fresnel lens 5-1 and the lattice pattern of the vertical lenticular lens 5-4 and horizontal lenticular lens 7-1 is reduced, and the generation of moiré caused by the interference between those patterns is controlled.

Here, ½ angle θ in the viewing angle characteristic is preferably as large as possible from the view point of controlling the generation of moiré. However, it is not preferable to make the ½ angle θ considerably large from the view point of favorably maintaining the sharpness of an image projected (that is, from the view point of controlling a blur of an image).

Table 1 shows measurement results of moiré and image sharpness, in the case where the angle $\tan^{-1}(fp/2L)$ in FIG. 8 is 1.4°. Five samples of the diffusing layer 5-2 different in a haze (degree of light diffused) and ½ angle θ are prepared. Symbols ○, Δ, and x in a column of moiré denote a state of no moiré generated, of moiré somewhat generated, and of moiré generated, respectively. Symbols ○ and x in a column of image sharpness denote a state of an image being sharp and of an image being blurred, respectively.

| Sample No | Haze | ½ Angle θ | Moire | Image sharpness |
|---|---|---|---|---|
| 1 | 23.7 | 1.30 | x | ○ |
| 2 | 27.2 | 1.40 | Δ | ○ |
| 3 | 48.7 | 1.45 | ○ | ○ |
| 4 | 63.9 | 1.50 | ○ | ○ |
| 5 | 77.8 | 1.60 | ○ | x |

The measurement results proved that an image blur is generated when ½ angle θ is 1.6°, in the case where the angle $\tan^{-1}(fp/2L)$ is 1.4°. Accordingly, moiré can be prevented from being generated with a favorable image sharpness by obtaining a value within the range of the following formula (2) with respect to the ½ angle θ in the viewing angle characteristic of the diffusing layer 5-2:

$$\tan^{-1}(fp/2L) \leq \theta \leq \tan^{-1}(fp/2L) + 0.2 \quad \text{formula (2)}$$

Further, the transmissive screen 4 includes the vertical lenticular lens 5-4 provided on the surface of the viewer side, since the Fresnel lens 5-1 is provided on the light source side among the surfaces of the board member 5 on the light source side. Accordingly, the transmissive screen having the Fresnel lens and the horizontal and vertical lenticular lenses includes two board members on the light source side and viewer side. Therefore, compared to a related-art transmissive screen including three board members, costs and takt time may be reduced with reduction in the number of components, luminance being improved, and stray light being reduced with the number of interfaces reduced.

In the transmissive screen 4, image light deflected in the vertical direction and in the horizontal direction by the vertical lenticular lens 5-4 and horizontal lenticular lens 7-1 is incident on the diffusing layer 7-3 after passing through a gap of the black stripe 7-2. Therefore, compared to the case of one of the vertical lenticular lens 5-4 and horizontal lenticular lens 7-1 being provided, light beams are widely diffused, and an amount of image light incident straight on the diffusing layer 7-3 (from the direction vertical to the board surface of the board member 7) is reduced.

The diffusing layer 7-3 is provided with a short distance to the black stripe 7-2. Therefore, with light flux narrowed by the black stripe 7-2 being incident on the diffusing layer 7-3 from the direction straight thereto, a portion where the light flux collides with particles in the diffusing layer 7-3 and a portion where no light flux collides therewith occur. As a result, glare may be generated when a bright image is displayed. On the contrary, light flux is deflected in both the vertical and horizontal directions, and image light further widely diffused is incident on the diffusing layer 7-3 as described above, the glare of such image can also be controlled.

Figure 10A:
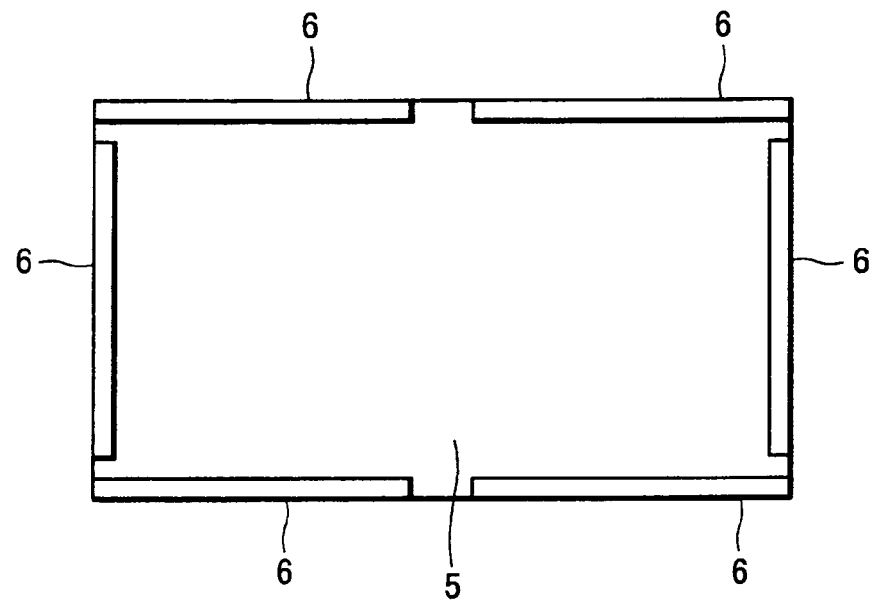
FIGS. 10A and 10B are views showing a method of assembling the transmissive screen shown in FIG. 2.
Figure 10B:
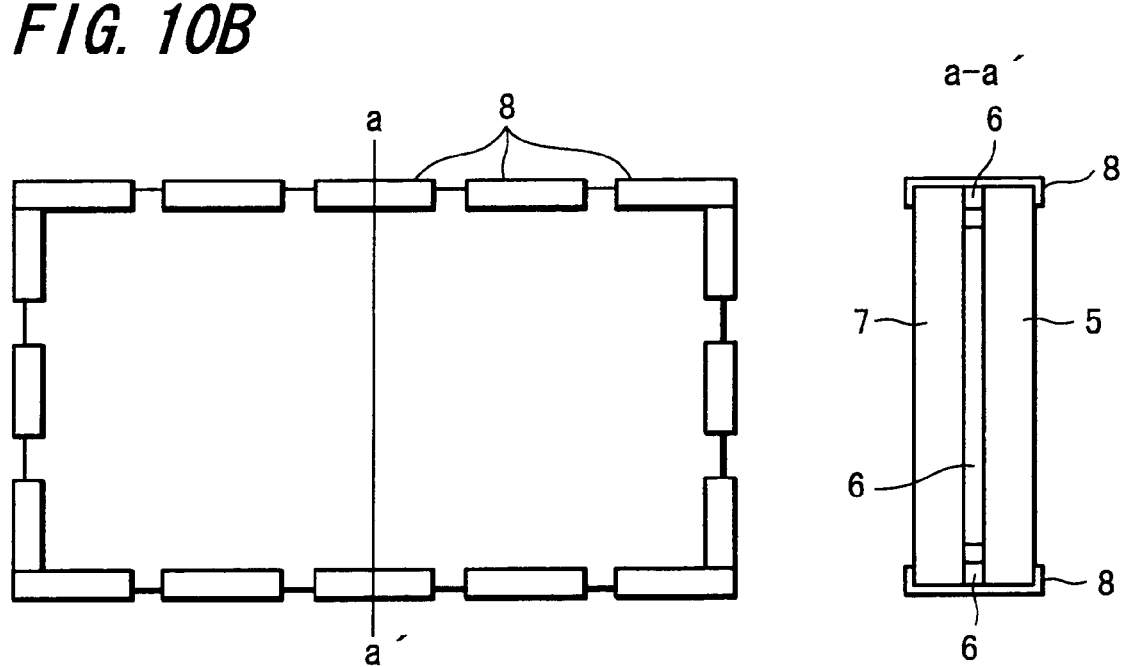

In addition, an example of assembling the transmissive screen 4 is explained with reference to FIGS. 10A and 10B. Glass substrates having a high rigidity are used as the substrates 5-3 and 7-4 of the board members 5 and 7. Therefore, if the vertical lenticular lens 5-4 on the surface of the viewer side of the board member 5 and the horizontal lenticular lens 7-1 on the surface of the light source side of the board member 7 are directly in contact with each other, the shape of the lenses may be damaged by being pressed to and scraped against each other.

Accordingly, in order for the vertical lenticular lens 5-4 on the viewer side of the board member 5 and the horizontal lenticular lens 7-1 on the light source side of the board member 7 not to be directly in contact with each other, the spacer 6 to separate the board members 5 and 7 is provided, as shown in FIG. 2. FIG. 10A shows the spacer 6 seen from the light source side of the board member 7. Further, as shown in FIG. 10B, the board members 5 and 7 are fixed together by cushion tape 8 in the state of the board member 5 and the board member 7 being separated by means of the spacer 6.

It should be noted that in the above-described embodiment the vertical lenticular lens is provided on the surface of the viewer side of the board member 5 and the horizontal lenticular lens is provided on the surface of the light source side of the board member 7, regarding the board member 5 on the light source side and the board member 7 on the viewer side both constituting the transmissive screen 4. However, on the contrary, the horizontal lenticular lens may be provided on the surface of the viewer side of the board member 5, and the vertical lenticular lens may be provided on the surface of the light source side of the board member 7.

It should be understood by those skilled in the art that various modifications, combinations, sub-combinations and alterations may occur depending on design requirements and other factors insofar as they are within the scope of the appended claims or the equivalents thereof.

The invention claimed is:

1. A transmissive screen, comprising:
   a first board member on a light source side, the first board member including a Fresnel lens on a surface of the light source side and one of a vertical lenticular lens or a horizontal lenticular lens on a surface of a viewer side; and
   a second board member on the viewer side, the second board member including the other of the vertical lenticular lens or the horizontal lenticular lens;
   the first board member including a diffusing layer between the Fresnel lens and the lenticular lens on the surface of the viewer side at a position close to the Fresnel lens;
   wherein a relation represented by $\theta \geq \tan^{-1}(fp/2L)$ is obtained, where θ is a diffusion angle at which a distribution characteristic of diffused light passing through the diffusing layer is half the peak gain, fp is a pitch of the Fresnel lens, and L is a light path between the diffusing layer and the lenticular lens on the surface of the viewer side.

2. A transmissive screen according to claim 1,
   wherein a relation represented by $\tan^{-1}(fp/2L) \geq \theta \geq \tan^{-1}(fp/2L) + 0.2$ is obtained, where θ is the diffusion angle, fp is the pitch, and L is the light path.

3. A transmissive screen according to claim 1,
wherein the second board member includes one of an antiglare layer, an antireflection layer, or a layer functioning as the antiglare layer or the antireflection layer on the surface of the viewer side.

4. A transmissive screen according to claim 1,
wherein the second board member includes a diffusing layer positioned closer to the viewer side than to the lenticular lens on the surface of the light source side.

5. A transmissive screen according to claim 1,
wherein the first board member includes a substrate made of glass.

6. A transmissive screen according to claim 1,
wherein each of the first and second board members includes a substrate made of glass, the transmissive screen further comprising
a spacer separating the first and second board members.

7. A rear projection display apparatus using an eccentric optical system in which a center of a screen is not on an axis of a projection system, the rear projection display apparatus comprising:
a transmissive screen on which image light emitted from an image light source is projected from the rear side, the transmissive screen including
a first board member on a light source side, the first board member including a Fresnel lens on a surface of the light source side and one of a vertical lenticular lens or a horizontal lenticular lens on a surface of a viewer side; and
a second board member on the viewer side, the second board member including the other of the vertical lenticular lens or the horizontal lenticular lens;
the first board member including a diffusing layer between the Fresnel lens and the lenticular lens on the surface of the viewer side at a position close to the Fresnel lens;
wherein a relation represented by $\theta \geq \tan^{-1}(fp/2L)$ is obtained, where $\theta$ is a diffusion angle at which a distribution characteristic of diffused light passing through the diffusing layer is half the peak gain, fp is a pitch of the Fresnel lens, and L is a light path between the diffusing layer and the lenticular lens on the surface of the viewer side.

8. A rear projection display apparatus according to claim 7,
wherein the transmissive screen has a relation represented by $\tan^{-1}(fp/2L) \geq \theta \geq \tan^{-1}(fp/2L)+0.2$, where $\theta$ is the diffusion angle, fp is the pitch and L is the light path.

9. A rear projection display apparatus according to claim 7,
wherein the second board member includes one of an antiglare layer, an antireflection layer, or a layer functioning as the antiglare layer or the antireflection layer on the surface of the viewer side.

10. A rear projection display apparatus according to claim 7,
wherein the second board member includes a diffusing layer positioned closer to the viewer side than to the lenticular lens on the surface of the light source side.

11. A rear projection display apparatus according to claim 7,
wherein the first board member includes a substrate made of glass.

12. A rear projection display apparatus according to claim 7,
wherein each of the first and second board members includes a substrate made of glass, and
the transmissive screen further includes a spacer separating the first and second board members.

* * * * *